United States Patent
Schneider et al.

(10) Patent No.: US 6,286,883 B1
(45) Date of Patent: Sep. 11, 2001

(54) DROP ROOM FLAT FLOOR SYSTEM EMPLOYING BIASING AND CUSHIONING ARRANGEMENT

(75) Inventors: Robert H. Schneider, Beaver Dam; Richard B. Lahti, deceased, late of Fond du Lac, both of WI (US), by Nancy Lahti, administrator

(73) Assignee: Applied Power Inc., Butler, WI (US)

( * ) Notice: Subject to any disclaimer, the term of this patent is extended or adjusted under 35 U.S.C. 154(b) by 0 days.

(21) Appl. No.: 09/198,655

(22) Filed: Nov. 24, 1998

Related U.S. Application Data

(63) Continuation-in-part of application No. 08/837,047, filed on Apr. 11, 1997, now Pat. No. 5,984,396.
(60) Provisional application No. 60/066,822, filed on Nov. 26, 1997.

(51) Int. Cl.$^7$ .................................................. B60P 3/35
(52) U.S. Cl. ................. 296/26.14; 296/165; 296/26.13
(58) Field of Search ............................ 296/26.12, 26.13, 296/26.14, 165, 171, 175, 172; 52/67

(56) References Cited

U.S. PATENT DOCUMENTS

| | | | |
|---|---|---|---|
| Re. 32,262 | 10/1986 | Stewart | 296/171 |
| 1,279,819 | 9/1918 | Zingsheim . | |
| 2,704,223 | 3/1955 | Houdart | 296/26 |
| 2,732,251 | 1/1956 | Meaker | 296/23 |
| 2,813,747 | 11/1957 | Rice, Jr. | 296/23 |
| 2,842,972 | 7/1958 | Houdart | 74/91 |
| 2,901,282 | 8/1959 | Meaker | 296/23 |
| 3,106,750 | 10/1963 | Jarman | 20/2 |
| 3,169,280 | 2/1965 | Jarman | 20/2 |
| 3,719,386 | 3/1973 | Puckett et al. | 296/20 |
| 4,049,310 | 9/1977 | Yoder | 296/26 |
| 4,500,132 | 2/1985 | Yoder | 296/171 |
| 4,930,837 | 6/1990 | Marsh et al. | 296/165 |
| 5,090,749 | 2/1992 | Lee | 296/171 |
| 5,237,782 | 8/1993 | Cooper | 52/67 |
| 5,280,985 | 1/1994 | Morris | 296/26 |
| 5,295,430 | 3/1994 | Dewald, Jr. et al. | 92/165 R |
| 5,332,276 | 7/1994 | Blodgett, Jr. | 296/26 |
| 5,333,420 | 8/1994 | Eden | 52/67 |

(List continued on next page.)

FOREIGN PATENT DOCUMENTS

4429927A1   8/1994   (DE) .............................. B65D/88/12

*Primary Examiner*—Joseph D. Pape
(74) *Attorney, Agent, or Firm*—Quarles & Brady LLP

(57) ABSTRACT

A vehicle having a slide-out room section includes an operating mechanism for moving the slide-out room section laterally relative to the stationary room section for expanding the interior volume of the vehicle. The slide-out room section has an outer end which is mounted via a vertically movable connection arrangement to the operating mechanism, and a cooperative support arrangement is provided for the inner end of the slide-out room section to enable the slide-out room section to be vertically dropped when fully extended to place the slide-out room section floor flush with the floor of the stationary room section. The vertically movable connection arrangement includes a support member interconnected with the extension member and movable therewith, and a mounting member secured to the movable room section and engaged with the support member. A biasing and cushioning arrangement is provided for urging the movable room section upwardly as the movable room section is moved to its retracted position and for preventing shock to the vehicle as the movable room section is lowered to its extended position. Wedges are provided beneath the movable room section to help lift and lower the movable room section when it is retracted and extended, and to support the movable room, and seal it to the stationary room, when retracted. The invention provides a flat floor arrangement for a slide-out room section without any significant modifications to existing slide-out room section operating mechanisms.

29 Claims, 7 Drawing Sheets

U.S. PATENT DOCUMENTS

| | | | |
|---|---|---|---|
| 5,491,933 | 2/1996 | Miller et al. | 52/67 |
| 5,570,924 | 11/1996 | Few et al. | 296/175 |
| 5,577,351 | 11/1996 | Dewald, Jr. et al. | 52/67 |
| 5,620,224 | 4/1997 | DiBiagio et al. | 296/26 |
| 5,706,612 | 1/1998 | Tillet | 52/67 |
| 5,732,839 | 3/1998 | Shimmang et al. | 220/1.5 |
| 5,758,918 | 6/1998 | Schneider et al. | 296/26 |
| 5,902,001 * | 11/1999 | Schneider | 296/26.13 |
| 5,915,774 * | 6/1999 | Tiedge | 296/26.13 |
| 5,984,396 * | 11/1999 | Schneider | 296/26.14 |

* cited by examiner

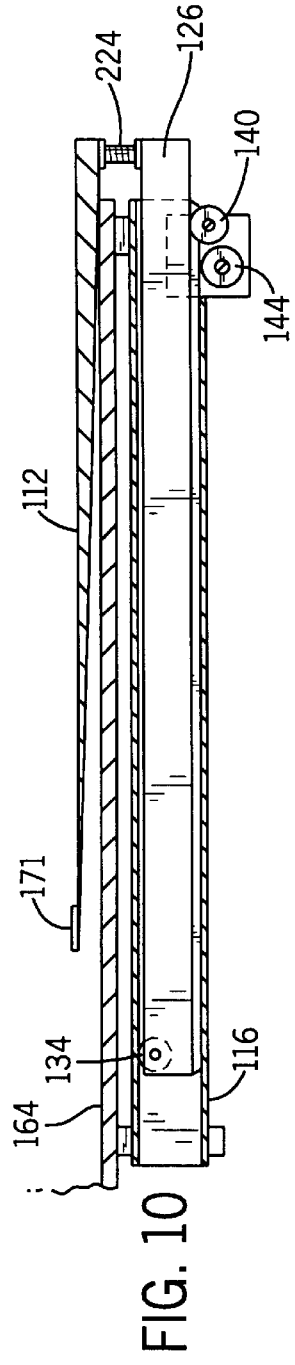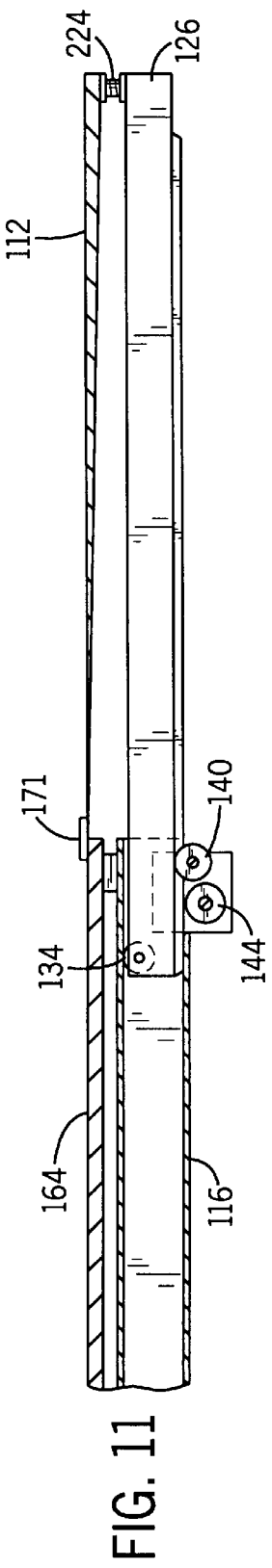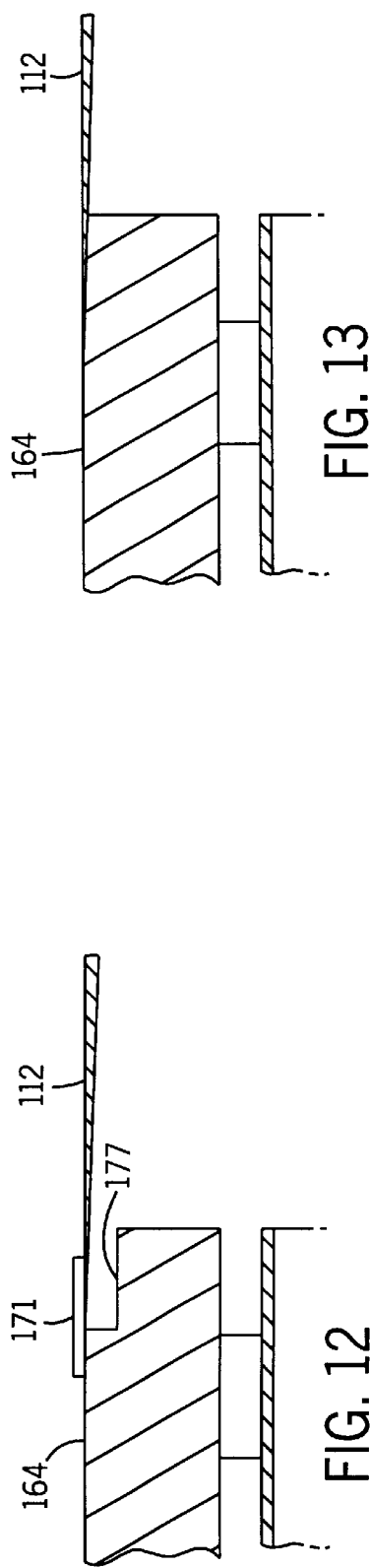

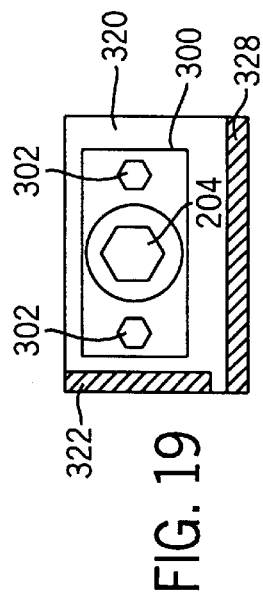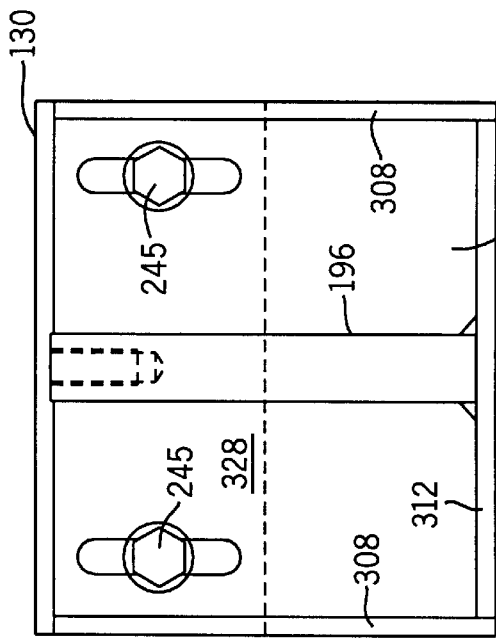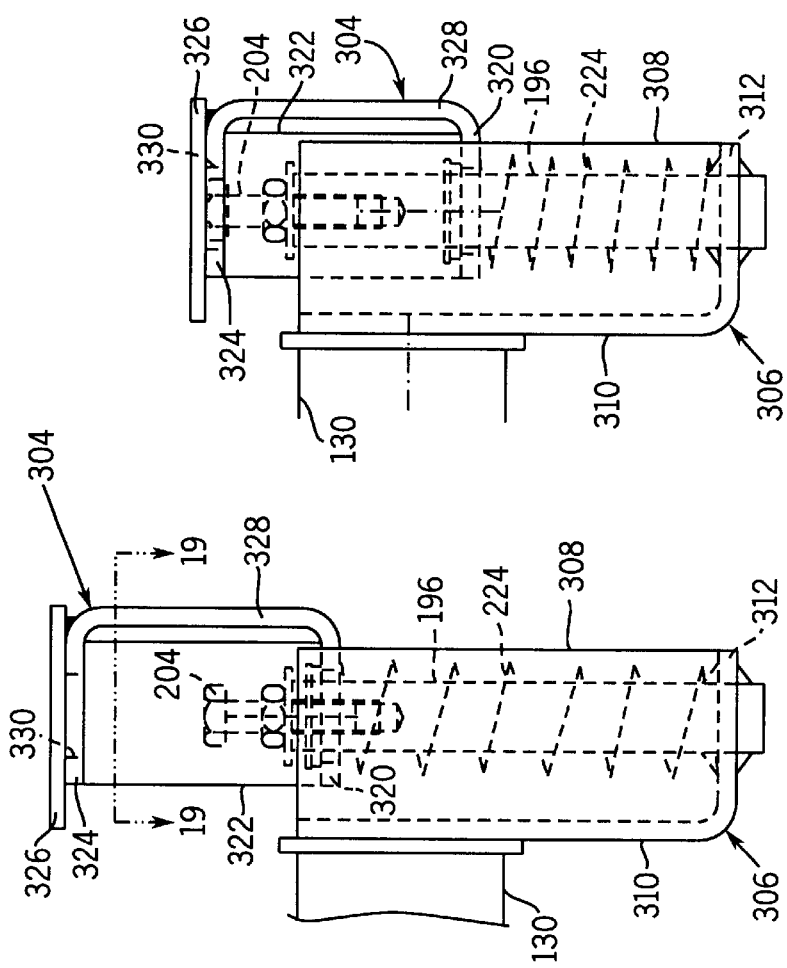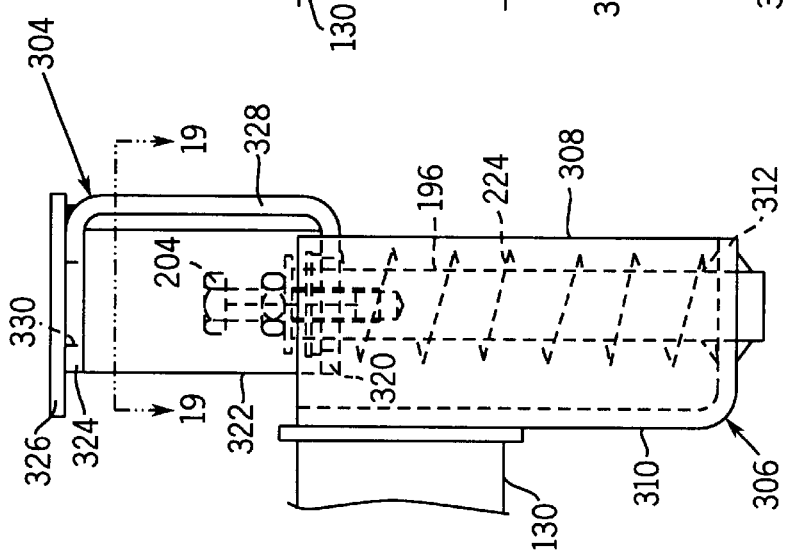

DROP ROOM FLAT FLOOR SYSTEM EMPLOYING BIASING AND CUSHIONING ARRANGEMENT

CROSS-REFERENCES TO RELATED APPLICATIONS

This application claims the benefit of provisional U.S. Patent Application No. 60/066,822 filed Nov. 26, 1997 and is a continuation-in-part of copending U.S. patent application Ser. No. 08/837,047 filed Apr. 11, 1997, now U.S Pat. No. 5,984,396.

STATEMENT REGARDING FEDERALLY SPONSORED RESEARCH OR DEVELOPMENT

Not Applicable.

BACKGROUND OF THE INVENTION

1. Field of the Invention

This invention relates to vehicles having expandable room sections, and more particularly to an improved arrangement for providing a flat floor condition when an expandable room section is moved to an extended position relative to the vehicle.

2. Discussion of the Prior Art

In order to increase the available interior space of recreational vehicles or trailers, it is known to provide a slide-out room section integral with the structure of the vehicle or trailer. During transit, the slide-out room section is retracted and stored in the interior of the vehicle or trailer, with the exterior wall of the slide-out room section approximately flush with the exterior of the vehicle or trailer. To use the slide-out room section, the vehicle is first parked and leveled. The slide-out room section is then slid outward from the vehicle to an extended position, increasing the interior space of the vehicle.

In prior art constructions, the floor of the movable slide-out room section is typically supported on the floor of the stationary room section to which the slide-out room section is movably mounted. With this construction, the floor of the slide-out room section is higher than the floor of the stationary room section, which creates a step-up from the stationary floor to the slide-out room section floor when the slide-out room section is in its extended position. This step formed by the differential in floor height is undesirable, inconvenient and can lead to an injury from a person unwarily tripping or stumbling over the step. Besides limiting the mobility of an occupant of the slide-out room section, the step can cause difficulty in furniture placement and detract from the overall aesthetic appearance of the floor.

To address the problems created by the floor height differential discussed above, various slide-out room structures have been proposed which allow the floor of the movable room section to be flush with the floor of the stationary room section when the slide-out room section is in its extended position. One such flat floor slide-out apparatus is disclosed in U.S. Pat. No. 5,491,933, issued Feb. 20, 1996 to Miller et al. In this patent, each of a pair of inner tubes is slidably mounted to one of a pair of outer tubes. The inner tubes are connected to the slide-out room section, and extension of the inner tubes relative to the outer tubes functions to move the slide-out room outwardly relative to the vehicle. Movement of the inner tubes is caused by a gear engaged with a gear track associated with each inner tube. Each outer tube has a ramped recess formed in an upper wall. A roller is mounted to the inner end of each inner tube, and rides along the ramped recess as the inner tube is extended relative to the outer tube. This movement results in the inner tube pivoting about the drive gear, to lower the outer end of the inner tube and to thereby lower the outer end of the slideout room section. This structure is disadvantageous in that substantial stresses and shocks are placed on the drive gear by the weight of the slide-out room section as the inner tube pivots on the drive gear. Further, this construction requires modification to the structure of the outer tube which entails tooling and manufacturing costs.

Another flat floor slide-out arrangement is illustrated in Schneider U.S. patent application Ser. No. 08/823,169, filed Mar. 25, 1997 (Attorney Ref.: 796-00043) now U.S. Pat. No. 5,902,201. The construction illustrated in this patent application employs a notch formed in the inner end of each inner tube, with a gear track extending along the lower end of the inner tube and along the notch. As the drive gear rotates to extend the inner beam outwardly, the drive gear rides along the contour of the gear track provided by the notch, which results in simultaneous extension and downward movement of the inner tube relative to the outer tube to extend and lower the slide-out room section relative to the stationary room section. This construction is generally satisfactory, but again entails modification of the inner tube or beam in order to lower the slide-out room section upon extension.

Still other flat floor slide-out arrangements are disclosed in Schneider U.S. patent application Ser. No. 08/837,047, filed Apr. 11, 1997 (Attorney Ref.: 796-00042) now U.S. Pat. No. 5,984,396. This patent application describes a number of mounting assemblies for providing vertical movement of a slide-out room section relative to an extension member, such as an inner rail member, for moving the slide-out room section between lowered and raised positions when the slide-out room section is moved between extended and retracted positions. The present application improves upon the mounting assemblies set forth in the '047 application.

SUMMARY OF THE INVENTION

It is an object of the present invention to provide a flat floor slide-out room section for a vehicle which accomplishes a flat floor condition without modification to the beams or rails to which the slide-out room section is mounted, and which provides movement of the slide-out room section between its extended and retracted positions. It is a further object of the invention to provide a flat floor slide-out arrangement which is extremely simple in its components and assembly, yet which provides highly reliable operation in raising and lowering the slide-out room section during movement of the slide-out room section between its extended and retracted positions. Yet another object of the invention is to provide a relatively simple and straight forward modification in the mounting of the slide-out room section to the beam to which the slide-out room section is mounted, for providing movement of the slide-out room section between a raised and lowered position for providing a flat floor condition when the slide-out room section is extended. Still another object of the present invention is to provide a flat floor slide-out arrangement employing a biasing and cushioning mechanism for urging the slide-out room section upwardly as it moves to its retracted position, and for dampening shocks to the slide-out room section and the vehicle as the slide-out room section is moved to its extended position.

In accordance with the invention, a flat floor arrangement is provided for a vehicle including a movable room section having a floor which is movable relative to a stationary room section having a floor. An operating mechanism is mounted to the vehicle and includes an extension member interconnected with the movable room section for moving the movable room section between a retracted position and an extended position for increasing the interior volume of the vehicle. The invention contemplates a vertically movable connection arrangement interposed between the movable room section and the extension member of the operating mechanism, for providing substantially vertical movement of the movable room section relative to the operating mechanism as the movable room section is moved laterally relative to the stationary room section. The vertically movable connection arrangement includes a support member interconnected with the extension member and movable therewith, and a mounting member secured to the movable room section and engaged with the support member. The mounting member is mounted to the support member so as to be vertically movable relative thereto such that vertical movement of the mounting member relative to the support member results in vertical movement of the movable room section relative to the extension member. The support member defines a first laterally extending wall and the mounting member defines a second laterally extending wall within which an opening is formed. The support member extends through the opening so as to provide vertical movement of the mounting member relative to the support member. The vertically movable connection arrangement further includes stop structure associated with the support member and engageable with the mounting member for limiting the range of vertical movement of the mounting member relative to the support member. The stop structure includes an adjustable stop member engaged with the support member and engageable with the mounting member when the movable room section is in the extended position. The support member includes a vertically extending web disposed against an outer end of the extension member, and joined to the first laterally extending wall. The support member further includes a pair of integral parallel connection ears extending rearwardly of the web and connected to sides of the extension member. The support member and the extension member have adjustable structure for permitting adjustability of the support member relative to the extension member and the mounting member. The support member further includes a post fixed to and extending upwardly from the first laterally extending wall. The post is internally threaded to receive a threaded shaft of a stop bolt engageable with the mounting member when the movable room section is in its extended position. A nut and a first washer are engaged on the threaded shaft of the stop bolt and are disposed against a top end of the post. A second washer is loosely supported on the post beneath the second laterally extending wall. A bearing surrounds the post and has an upper portion disposed in the opening formed in the second laterally extending wall of the mounting member and a lower portion engageable with the second washer. The bearing permits vertical sliding movement of the mounting member relative to the support member as the movable room section is moved between its extended and retracted positions. The mounting member includes a vertical member extending upwardly from the second laterally extending wall, and a third laterally extending wall is joined to the vertical member and secured to an underside of the movable room section floor. A biasing and cushioning arrangement is interposed between the mounting member and the support member for urging the movable room section upwardly as the movable room section is moved to its retracted position, and for preventing shock to the movable room section and to the vehicle as the movable room section is lowered during movement to its extended position. The biasing and cushioning arrangement preferably takes the form of a coil spring surrounding the post and engaged between the first laterally extending wall of the support member and an underside of the second washer. The mounting member and the support member are constructed and arranged so as to provide an angular offset therebetween during movement of the movable room section between its extended and retracted positions, so as to enable the movable room section floor to tip relative to the stationary room section floor as the weight of the movable room section outwardly of the stationary room section floor exceeds the weight of the movable room section supported by the stationary room section floor to provide downward movement of the downward end of the movable room section. A cooperative support arrangement is interposed between the movable room section floor and the stationary room section floor for providing substantially vertical movement of the inner end of the movable room section as the movable room section is moved laterally to its extended position relative to the stationary room section.

The invention further contemplates an improvement in a vehicle having a stationary room section having a floor and a movable room section having a floor and being laterally movable between a retracted position and an extended position for increasing the interior volume of the vehicle. The movable room section has an inner end and an outer end. An operating mechanism has an extension member mounted to the vehicle and interconnected with the movable room section for laterally moving the movable room section between its extended and retracted positions. The improvement resides in a vertically movable connection arrangement interconnected with the movable room section at a location spaced from the inner end of the movable room section for providing substantially vertical movement of the outer end of the movable room section as the movable room section is moved laterally relative to the stationary room section. The vertically movable connection arrangement includes a support member interconnected with the extension member and movable therewith, and a mounting member secured to the movable room section and engaged with the support member. The support member defines a first laterally extending wall and an upwardly extending post fixed thereto, and the mounting member defines a second laterally extending wall slidably mounted relative to the post. A biasing and cushioning arrangement surrounds the post, and has one end acting against the first laterally extending wall and another end acting against a movable element slidably mounted on the support member. The biasing and cushioning arrangement urges the movable room section upwardly as the movable room section is moved to its retracted position, and prevents shock to the movable room section and the vehicle as the movable room section is lowered to its extended position.

In another aspect, the invention provides one or more wedges fixed to the movable room beneath it to help lift the room when it is retracted and support it in the retracted position. The wedges also help lower the room when it is extended. Supporting the room in the retracted position with the wedges provides better support for the room during road transit and provides a better fit, and therefore a better seal, between the movable and stationary rooms.

Further objects, features and advantages of the invention will be made apparent from the following detailed description taken together with the drawings.

BRIEF DESCRIPTION OF THE DRAWINGS

The drawings illustrate the best mode presently contemplated of carrying out the invention.

In the drawings:

FIG. 10 is a view of an alternate slide-out room floor section useable incorporated in the invention, shown retracted;

FIG. 11 is a view of the slide-out floor of FIG. 10, shown extended;

FIG. 12 is an alternate view of a slide-out floor inner end construction;

FIG. 13 is a view like FIG. 12 of another alternate construction;

FIGS. 16–19 are views illustrating an alternate construction of the end condition mounting assembly, including the bearing retainer of FIG. 15.

DETAILED DESCRIPTION OF THE INVENTION

The present invention provides an expandable room section attached to a known trailer or recreational vehicle which provides distinct advantages over the prior art, as will be described and appreciated hereafter. In the preferred embodiment, the trailer or recreational vehicle (generally referred to as "the vehicle") is equipped with a laterally movable wing or slide-out section used to provide additional interior room space. However, it should be understood that the invention can also apply to expandable sections or compartments provided on other vehicles for use in construction, military, medical, education, mobile broadcast, and other applications, to expand the inside volume of the vehicle.

Figure 1:
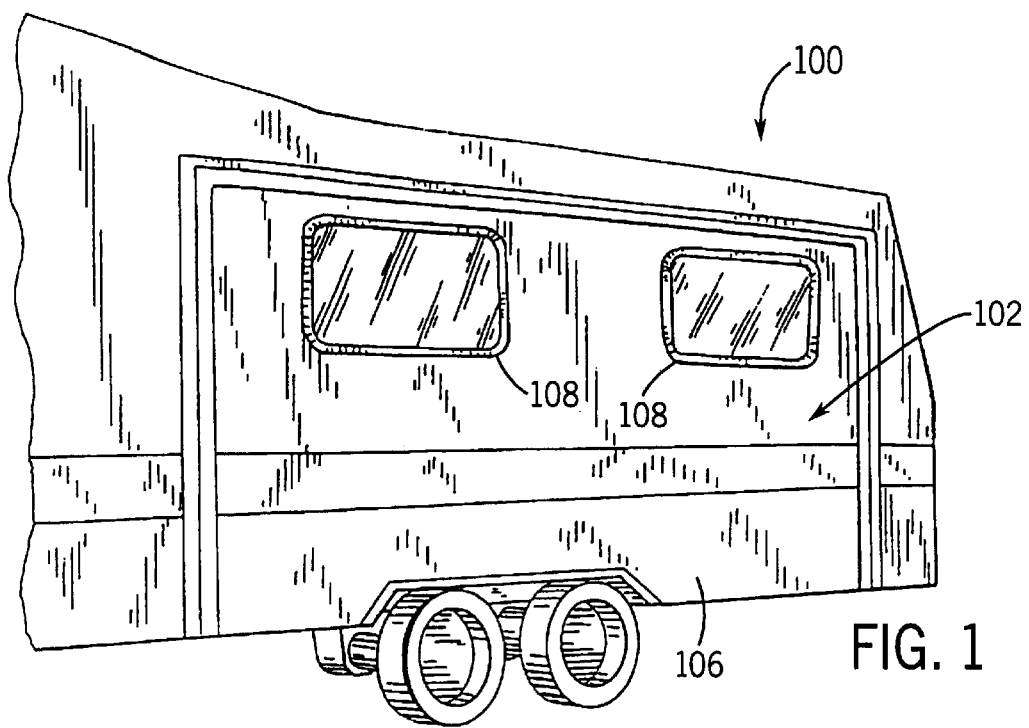
FIG. 1 is an isometric view of a vehicle, such as a recreational vehicle or trailer having a slide-out room section and in which the slide-out room section is in its retracted position.
Figure 2:
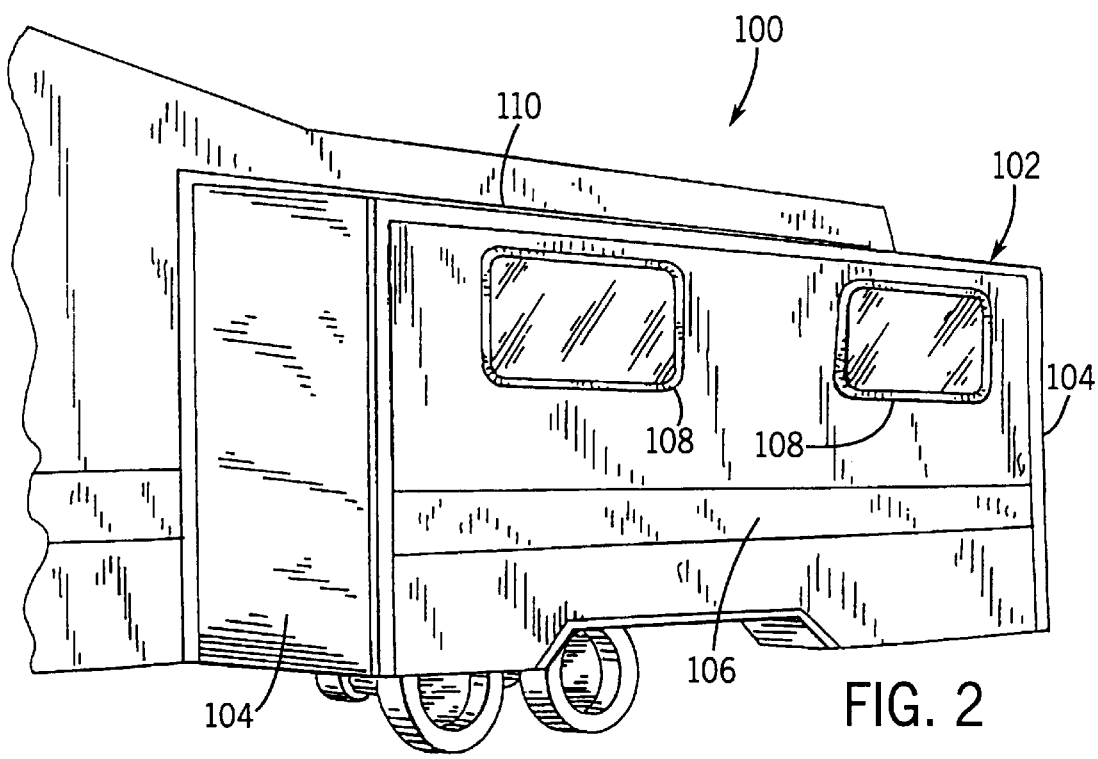
FIG. 2 is a view similar to FIG. 1 showing the slide-out room section in its extended position.

Referring now to the drawings, FIG. 1 illustrates a side perspective view of a vehicle 100 having mounted thereon an expanded telescopic slide-out room section 102 of the present invention in its fully retracted position. FIG. 2 is a view similar to FIG. 1, showing slide-out room section 102 fully extended or expanded. Slide-out room section 102 is rectangularly configured and includes a pair of parallel end walls 104, a side wall 106 with two windows 108, and an upper wall or roof 110.

Figure 3:
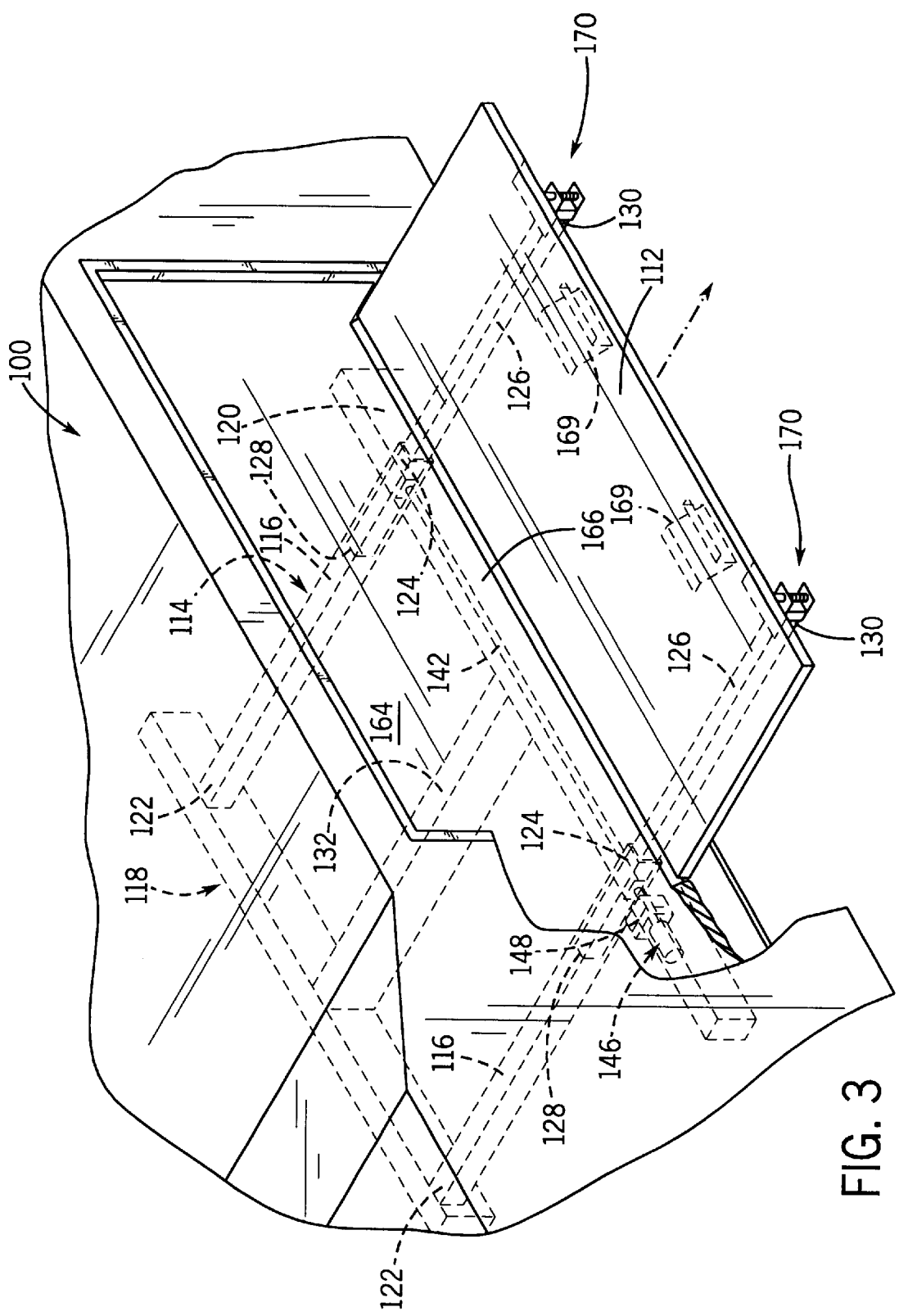
FIG. 3 is a fragmentary, perspective view of the slide-out room section floor in its extended position relative to the stationary room section floor with portions of an operating mechanism connected to the vehicle of FIG. 1 for moving the slide-out room section between its extended and retracted positions being shown in phantom lines.

FIG. 3 illustrates the slide-out room with the walls and roof removed so as to show only the internal floor 112 for slide-out room section 102, and an operating mechanism 114 interconnected with vehicle 100 and slide-out room section 102, for selectively controlling the extension and retraction of slide-out room section 102. Generally, operating mechanism 114 includes a pair of parallel tubular outer rail members 116 which extend between and are mounted to a pair of parallel structural frame members 118,120, which form part of the frame of vehicle 100 and which extend along the sides of the vehicle body. Each outer rail member 116 defines an inner end 122 secured to structural frame member 118. Each outer rail member 116 further defines an outer end 124 mounted to structural frame member 120. The ends 122,124 of outer rail members 116 are mounted to structural frame members 118,120 respectively, in any satisfactory manner, such as by welding.

Apertures or passages are formed in structural frame member 120, and are in alignment with the passages defined by tubular outer rail members 116. A tubular inner rail member 126 is received within the passage defined by each outer rail member 116, so as to be movable inwardly and outwardly in a telescoping manner relative to each outer rail member 116. Each inner rail member 126 extends outwardly of structural frame member 120 through the aperture or passages formed therein in alignment with the passage defined by the outer rail member 116 within which the inner rail member 126 is received.

Each inner rail member 126 defines an inner end 128 received within the passage defined by one of the outer rail members 116, and an outer end 130 located outwardly of the outer rail member 116 and structural frame member 120.

The frame of vehicle 100 further includes a central transverse cross member 132 which extends between and interconnects longitudinal structural frame members 118, 120 between outer rail members 116.

Figure 4:
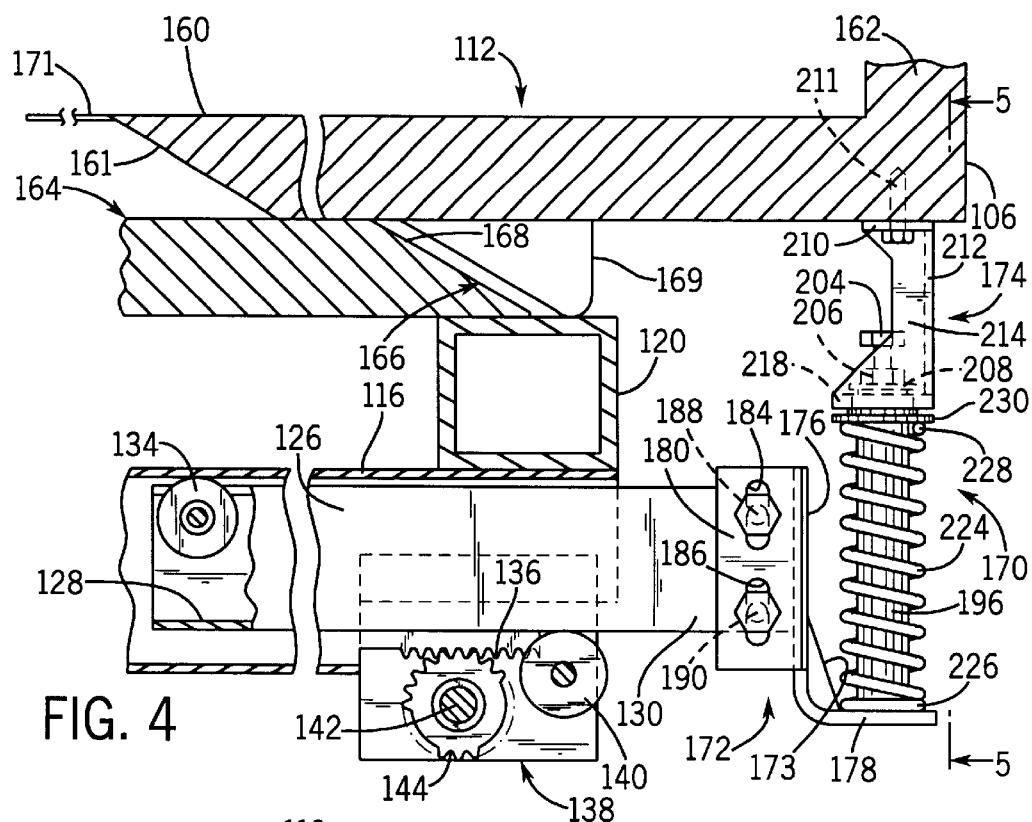
FIG. 4 is a partial sectional view showing a vertically movable connection arrangement for the slide-out room section operating mechanism of FIG. 3 showing the slide-out room section in its retracted position, and the movable room section raised relative to the stationary room section.
Figure 5:
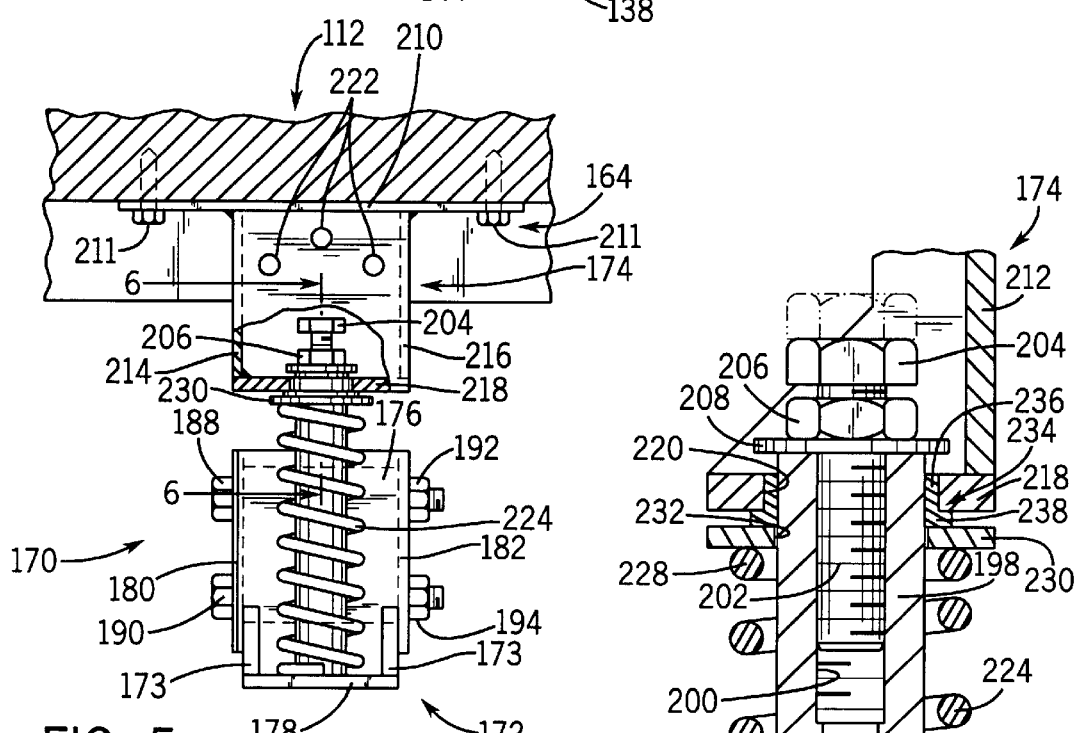
FIG. 5 is a partial end elevational view taken on line 5—5 of FIG. 4, with a portion shown in section.
Figure 6:
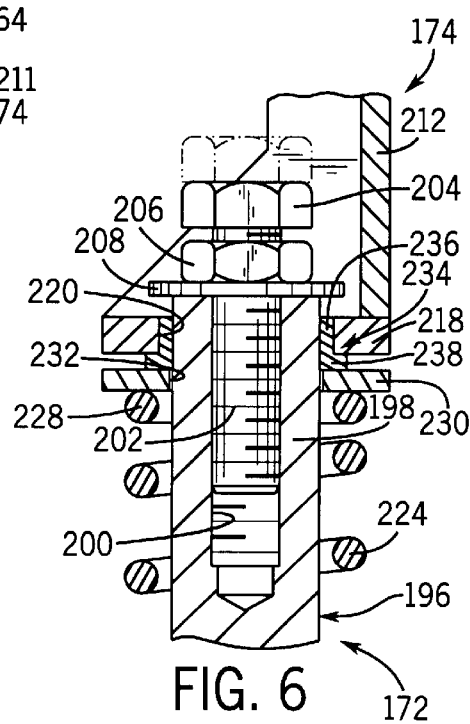
FIG. 6 is an enlarged, partial sectional view taken on line 6—6 of FIG. 5.

Referring to FIGS. 3 and 4, each of the inner rail members 126 has an upper roller 134 mounted adjacent its inner end 128. Roller 134 extends above the upper wall of the inner rail member 126, and engages the inner surface of the upper wall of the outer rail member 116 within which inner rail member 126 is received. A gear rack 136 is mounted to the lower wall of inner rail member 126, and defines a series of laterally spaced downwardly extending teeth, in a manner as is known. A bracket assembly 138 is mounted to the outer end 124 of each outer rail member 116 adjacent its connection to the structural frame member 120, and a pair of lower rollers 140 are rotatably mounted to bracket assembly 138 and are located one on either side of gear rack 136. Rollers 140 engage lower wall of inner rail member 126. With this construction, rollers 134 and 140 function to provide sliding inward and outward lateral movement of inner rail members 126 relative to outer rail members 116.

A drive system for moving inner rail members 126 inwardly and outwardly relative to outer rail members 116 includes a drive shaft assembly 142 rotatably supported by bracket assemblies 138 and a pair of drive gears 144. Each drive gear 144 has a series of circumferential teeth engaged with the teeth of one of the gear racks 136, such that rotation of drive shaft assembly 142 rotates drive gears 144 to move inner rail members 126 inwardly and outwardly relative to outer rail members 116. A motive device in the form of an integral motor-brake assembly 146 is mounted to a motor mounting bracket assembly 148 secured to one of the outer rail members 116 adjacent structural frame member 120, and is drivingly connected with one end of a drive shaft assembly 142. Motor-brake assembly 146 is preferably in the form of an electric motor having an integral brake, and is operable to selectively rotate and prevent rotation of drive shaft assembly 142 in response to input signals provided thereto by an operator, for selectively moving inner rail members 126 inwardly and outwardly relative to outer rail members 116.

In the event motor-brake assembly 146 is inoperable for any reason, or otherwise becomes incapable of rotating drive shaft assembly 142, a manual override assembly (not shown) can be used to impart rotation to drive shaft assembly 142 for selectively moving inner rail members 126 inwardly and outwardly relative to outer rail members 116.

The components and operation of operating mechanism as described above, including the manual override assembly, are in accordance with the disclosure of co-pending application Ser. No. 08/563,043, filed Nov. 27, 1995, now U.S. Pat. No. 5,758,918 the disclosure of which is hereby incorporated by reference. However, any suitable means of telescopically extending and retracting the inner rails relative to the outer rails could be used to practice the invention.

Slide-out room section 102 defines an outer end and an inner end. Referring to FIGS. 3 and 4, floor 112 of slide-out room section 102 defines an inner end 160 at the inner end of slide-out room section 102 which includes a beveled edge 161, and an outer end 162 at the outer end of slide-out room section 102 from which the slide-out room section side wall 106 extends upwardly. Slide-out room section 102 is movable inwardly and outwardly by operating mechanism 114 relative to a stationary room section defined by vehicle 100, which includes a stationary floor 164 which defines an outer end 166 supported by structural frame member 120 and an inner end defining a beveled edge 168.

A pair of wedges 169 (FIGS. 3 and 4) are fixed to the underside of the floor 112 to help lift the room 102 when it is retracted and to support the room when retracted during road transit. Such support is helpful to seal the room against the walls of the stationary room. The wedges 169 may be any suitable load bearing and wear resistant material, for example, they may be formed of sheet metal. The edges against which the wedges 169 cam up (when retracted) and down (when extended) should also be wear resistant and adapted for such camming action. As illustrated, this edge would be the upper outside corner of the steel frame member 120, which could be flattened or rounded in the area of contact with the wedges 169. It may be desirable to extend a subfloor (See FIG. 14, subfloor 175) outwardly so that the wedges cam against the edge of the subfloor, which would typically be made of plywood. Such an edge should be covered with a wear resistant material, such as sheet metal. A single wedge could also be used, if it was long enough, or more than two wedges could be used if desired, for example, for a more even distribution of the bearing load in transit.

In addition, the beveled edge 161 may alternatively be replaced by two or more ramps (e.g., See FIG. 14, ramp 173), which could also be formed of sheet metal, and the edge of the stationary floor 164 made square. In that case, the edge 161 would be spaced outwardly of the edge of the floor when the room was extended (See FIG. 14), and a load bearing flap 171 (e.g., stiff sheet metal) could be provided at the upper corner of the inner end 160 to bridge the gap between the stationary floor 164 and the movable floor 112 when the room is extended.

FIGS. 4–7 illustrate the first embodiment of an end condition mounting assembly constructed according to the invention, shown at 170, interposed between each inner rail member 126 and slide-out room section 102. Generally, each end condition mounting assembly 170 includes a support member 172 mounted to the end of inner rail member 126, and a mounting member 174 secured to floor 112 of slide-out room section 102.

Figure 7:
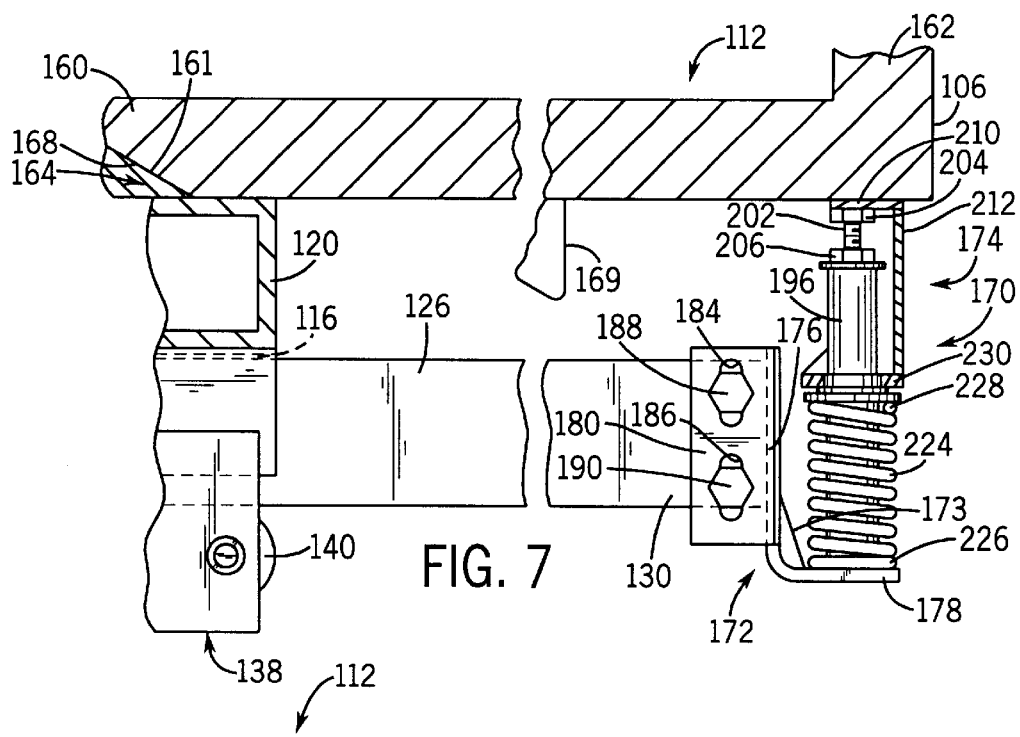
FIG. 7 is a partial sectional view similar to FIG. 4 showing the slide-out room section in its extended position and lowered such that the slide-out room section floor is flush with the stationary room section floor.

In the embodiment of FIGS. 4–7, support member 172 takes the form of a generally L-shaped member having a web 176 disposed against the outermost end of inner rail 126, and a flange 178 extending outwardly from the lower end of web 176. Gussets 173 are welded between and reinforce the web 176 and flange 178, one gusset 173 on each side. A pair of parallel connecting ears 180, 182 extend integrally and rearwardly from the web 176 along each side of inner rail 126, and are formed with upper and lower pairs of slots 184,186, respectively, suitably aligned with openings formed transversely of the inner rail ends 130. Support member 172 is adjustably retained in place relative to inner rail 126 by a pair of bolts 188,190 which are passed through the inner rail openings and the slots 184,186, respectively, and threaded into a pair of suitable nuts 192, 194. Manipulation of the bolts 188,190 and the nuts 192,194 will afford limited vertical adjustment of the support member 172 on the end of the inner rail 126. Support member 172 further includes an upwardly extending cylindrical post 196 mounted at its lower end, such as by welding, to the upper side of flange 178. As seen best in FIG. 6, the post 196 has an upper end 198 which is internally threaded at 200 to receive the threaded shaft 202 of a stop bolt 204 which is threadedly received in a locking nut 206 and passes through a first washer 208 disposed on top of the tubular member 196. Washer 208 may be rigidly mounted to nut 206, or alternatively may be sandwiched between nut 206 and the top of post 196. Stop bolt 204 and locking nut 206 may be manipulated so as to adjust the elevation of the head of stop bolt 204, as shown in phantom lines in FIG. 6, to adjust the elevation of slide-out room section 102 when fully extended and lowered, as shown in FIG. 7 and as will later be explained.

Mounting member 174 is embodied in a room bracket having a top plate 210 secured to the underside of slide-out room section 112 by a pair of fasteners 211. Extending downwardly from and connected by welding to top plate 210 is a back plate 212 and a pair of parallel side plates 214,216 which terminate in a flat, bottom plate 218 having an opening 220 through which the upper end 198 of post 196 passes. The upper portion of back plate 212 is formed with three auxiliary mounting holes 222 (FIG. 5) which enable mounting the bracket to a skirt of the stationary room behind the back plate 212.

End condition mounting assembly 170 further includes a biasing and cushioning arrangement in the form of a coil spring 224 which surrounds the post 196 and has a lower end 226 which bears against the upper surface of flange 178. Spring 224 has an upper end 228 which bears against and supports a second washer 230 having an oversized opening 232 through which the upper end 198 of the post 196 passes.

As will be further appreciated hereinafter, spring 224 functions to urge the slide-out room section 102 upwardly as the slide-out room section 102 is moved to its retracted position. Spring 224 also serves to cushion and dampen the movement of slide-out room section 102 as it is extended and moved toward its fully lowered position. The preferred embodiment discloses the biasing and cushioning arrangement in the form of a spring. A biasing and cushioning element is preferred to prevent a shock which could occur without it, when the room tips down when being extended, and to help push the end of the room up when it is being retracted. Other biasing and cushioning elements, such as a fluid charged cylinder, a compressible foam or elastomer, etc., may be used instead of the spring. In addition, although not preferred, in some applications no biasing and cushioning element may be needed. A stepped bearing 234 has an upper portion 236 disposed in the opening 220 between the bottom plate 218 and the post 196, and a radially enlarged lower portion 238 engageable with the underside of bottom plate 218, the top of washer 230 and post 196. Bearing 234 and the opening 232 in washer 230 are sized to provide a slight angular tilting of mounting member 174 relative to post 196 as slide-out room section floor 112 is moved between its lowered and raised positions during retraction and extension of slide-out room section 102. Bearing 234 is preferably constructed of a low-friction material such as nylon, although any satisfactory plastic or metal material may be employed.

In operation, the embodiment of FIGS. 4–7 functions as follows. During transit, slide-out room section 102 is in its retracted position of FIG. 1, which is partially shown in section in FIG. 4, wherein slide-out room section floor 112 is located above stationary room section 164, such that slide-out room section 102 rests on and is supported by stationary room section floor 164. Spring 224 functions to bias mounting member 174 upwardly relative to support member 172, and to thereby urge slide-out room section 102 towards its raised position. When it is desired to move slide-out room section 102 to its extended position of FIG. 2, the vehicle 100 is first parked and leveled, and the operator then actuates operating mechanism 114, so as to extend inner rail members 126 relative to outer rail members 116 by operation of motor-brake assembly 146 to rotate drive shaft assembly 142 and drive gears 144, which moves inner rail members 126 outwardly via engagement with gear rack 136 on each outer rail member 116. This extension of inner rail members 126 results in movement of slide-out room section 102 from its retracted position of FIG. 1 towards its extended position of FIG. 2. As slide-out room section 102 moves outwardly relative to stationary room section floor 164, slide-out room section 102 reaches a point at which the weight of slide-out room section outwardly of stationary room section floor 164 exceeds the weight of slide-out room section 102 supported by stationary room section floor 164. At this point, slide-out room section 102 tips in a clockwise direction about the outer end of stationary room section 164 at its intersection with beveled edge 168, such that slide-out room section floor 112 is angled relative to stationary room section floor 164. As slide-out room section 102 tips, bearing 234 and washer opening 232 accommodate angular movement of mounting member 174 relative to post 196. Bearing 234 further provides a low friction arrangement which enables sliding movement of the mounting member 174 along post 196. When slide-out room section 102 pivots in this manner, relative to stationary room section floor 164, mounting member 174 begins to slide downwardly along post 196 and spring 224 starts to compress. Extension of inner rail members 126 continues such that as slide-out room section 102 approaches its fully extended position, beveled edge 161 of slide-out room section floor 112 moves downwardly along mating beveled edge 168 defined by stationary room section floor 164. This results in downward vertical movement of the inner end of slide-out room section 102. Spring 224 continues to compress, cushioning and dampening the downward movement of slide-out room section 102 so as to minimize shock to the surrounding components. When slide-out room section 102 is in its fully extended position of FIG. 7, inner end 160 of slide-out room section floor 112 is supported by structural frame member 120 and beveled edges 161,168 of slide-out room section floor 112 and stationary room section 164, respectively, are engaged with each other in a complementary relationship, such that the upper surfaces of slide-out room section floor 112 and stationary room section floor 164 are substantially coplanar. The outer end of slide-out room section 102 is supported by engagement of the head of stop bolt 204 with top plate 210 and spring 224 is compressed under the weight of the slide-out room section 102.

When it is desired to return slide-out room section 102 to its retracted position of FIG. 4, the operator actuates the controls of operating mechanism 114 to operate motor-brake assembly 146 in a reverse direction so as to move inner rail members 126 inwardly relative to outer rail members 116. Upon initial movement of slide-out room section 102 away from its fully extended position, beveled edge 161 of slide-out room section floor 112 rides along beveled edge 168 of stationary room section floor 164 so as to displace inner end 160 of slide-out room section floor 112 upwardly relative to stationary room section floor 164, until the lower surface of slide-out room section floor 112 engages the upper surface of stationary room section floor 164 at its intersection with beveled edge 168. This vertical upward movement of the inner end of slide-out room section 102 causes inner end 160 of slide-out room section 102 to move upwardly relative to outer end 162, thus again tipping slide-out room section 102 and its floor 112 relative to stationary room section floor 164. During retraction of slide-out room section 102, spring 224 functions to assist in raising the outer end of slide-out room section 102 as slide-out room section 102 is moved from its extended position. Stop bolt 204 maintains engagement with top plate 210 to support the outer end of slide-out room section 102 until the weight of slide-out room section 102 inwardly of the fulcrum defined by the intersection of beveled edge 168 with the upper surface of stationary room section floor 164 exceeds the weight of slide-out room section 102 outwardly thereof. Slide-out room section 102 then returns to its configuration of FIG. 4, in which slide-out room section floor 112 rests on and is supported by stationary room section floor 164. Again, bearing 234 and opening 232 accommodate movement of mounting member 174 as slide-out room section 102 pivots during retraction. Because mounting member 174 slides upwardly along post 196 during retraction of slide-out room section 102, first washer 208 can be adjusted relative to bottom plate 218 of mounting member 174 by means of the bolts 188,190 and nuts 192,194 on support member 172 to define the limit of upward vertical movement of slide-out room section 102.

It can thus be appreciated that slide-out room section 102 is lowered relative to the stationary room section of vehicle 100 when operating mechanism 114 is operated to fully extend slide-out room section 102, without any modification or alteration to the basic components of operating mechanism 114, as shown and described in the above referenced '043 patent application, other than end condition mounting assembly 170 which provides upward and downward vertical movement of the outer end of slide-out room section 102 relative to inner rail members 126.

In each embodiment, an appropriate seal construction is provided between roof 110, side walls 104 and the underside of slide-out room section 102, and the edges of the opening in vehicle 100 within which slide-out room section 102 is received. The seal between slide-out room section roof 110 and the adjacent edge of the vehicle opening accommodates the lowering and raising of slide-out room section 102, in accordance with known seal technology.

Figure 8:
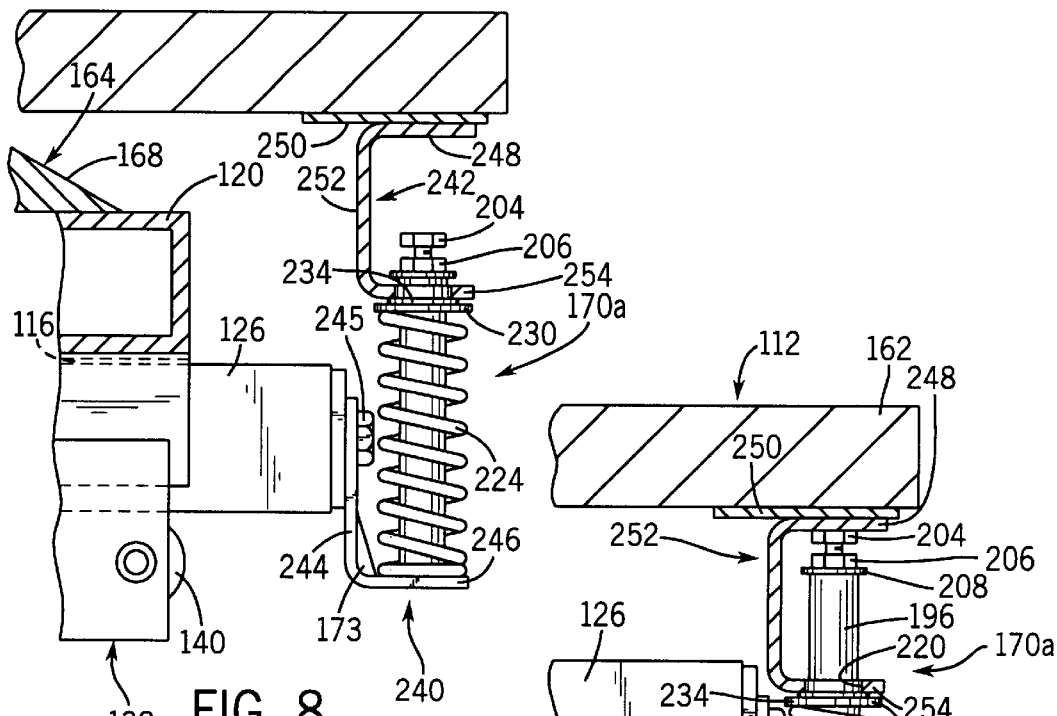
FIG. 8 is a partial sectional view of an alternative vertically movable connection arrangement for the slide-out room section operating mechanism of FIG. 3 showing the slide-out room section raised relative to the stationary room section.
Figure 9:
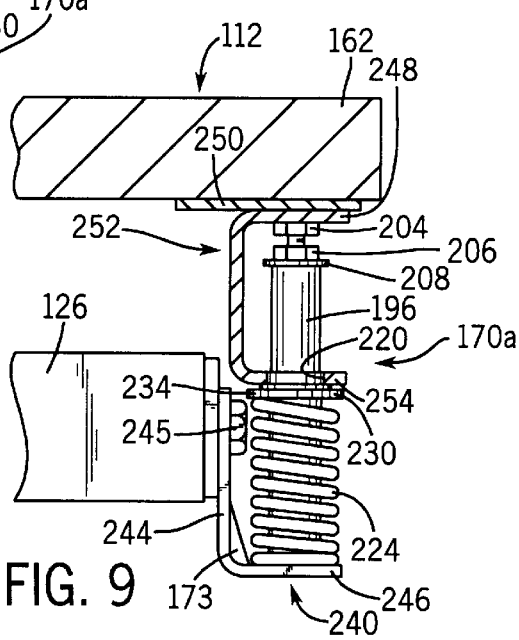
FIG. 9 is a view similar to FIG. 8 showing the slide-out room section in a lowered position relative to the stationary room section.

FIGS. 8 and 9 illustrate an alternative end condition mounting assembly 170a for use in place of end condition mounting assembly 170 for interconnecting slide-out room section 102 with inner rail members 126. In the embodiment of FIGS. 8 and 9, the basic components of operating mechanism 114 and slide-out room section 112 are as described with reference to FIGS. 1–7.

Like the embodiment illustrated in FIGS. 4–7, end condition mounting assembly 170a includes a support member 240 and a mounting member 242. Support member 240 is in the form of a generally L-shaped section having a vertical web 244 mounted to the end of inner rail member 126 by any satisfactory means, such as by one, two or more bolts 245, and a flange 246 extending outwardly from the lower end of web 244. Flange 246 supports a cylindrical post 196 as described in FIGS. 4–7.

Mounting member 242 is in the form of a substantially C-shaped channel section having an upper flange 248 secured to a plate 250 which, in turn, is secured such as by welding or fasteners to the underside of slide-out room section floor 112 at its outer end 162. Mounting member 242 also includes a vertical web 252 and a lower flange 254 extending outwardly from the lower end of web 252. Like the bottom plate 208 in FIGS. 4–7, lower flange 254 is formed with the opening 220 through which the post 196 passes. Stop bolt 204, nut 206, first washer 208, spring 224, second washer 230 and bearing 234 are also identical to those components described in FIGS. 4–7.

In operation, the embodiment of FIGS. 8–9 functions similarly to that of FIGS. 4–7 in providing upward and downward vertical movement of slide-out room section 102 during retraction and extension of slide-out room section 102 by operation of operating mechanism 114. In the embodiment of FIGS. 8 and 9, bearing 234 and opening 232 accommodate tipping of slide-out room section 102 as it is raised and lowered, while bearing 234 enables lower flange 254 to slide along post 196 and provides a low friction arrangement facilitating vertical movement of slide-out room section 102. Spring 224 continues to provide biasing and cushioning as slide-out room section 102 is moved between retracted and extended positions.

Figure 14:
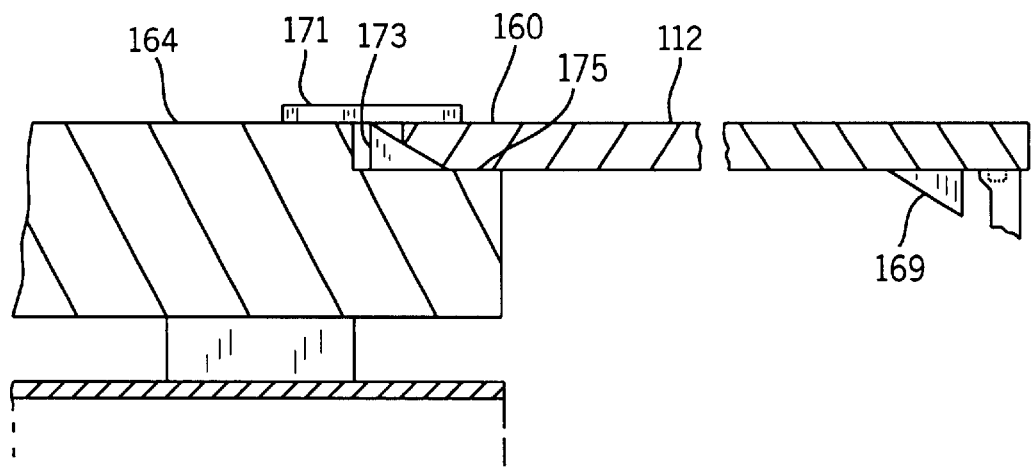
FIG. 14 is a view like FIGS. 12 and 13 of an embodiment similar to that shown in FIG. 4.

FIGS. 11–14 illustrate different possible slide-out floor constructions which can be incorporated in the invention. In FIGS. 10 and 11, the floor 112 tapers gradually from its outer end to its inner end, and a flap 171 is rigidly fixed at the inner end to support the inner end on the stationary floor in the extended position. Such a gradually tapering floor must be made of a strong and rigid material so as to bear floor loading in thin sections, for example, rigid sheet metal. FIG. 12 illustrates how the edge of the stationary floor can be undercut at 177 so as to accomodate the thickness, however small, of the inner end of the floor beneath the flap 171. FIG. 13 is like FIG. 12, but without the flap 171, and the edge of the stationary floor beveled to mate with the inner edge of the slide-out floor, so that the upper surface of the slide-out floor is flush with the upper surface of the stationary floor. FIG. 14, described above, illustrates a floor as in FIG. 4, together with a separate ramp 173 secured to subfloor 175 and flap 171 bridging the gap between the slide-out floor and the stationary floor. In FIG. 14, the lower corner of the inner end 160 is shown as being angled, rather than the entire edge being made ramped, as is also acceptable.

Figure 15:
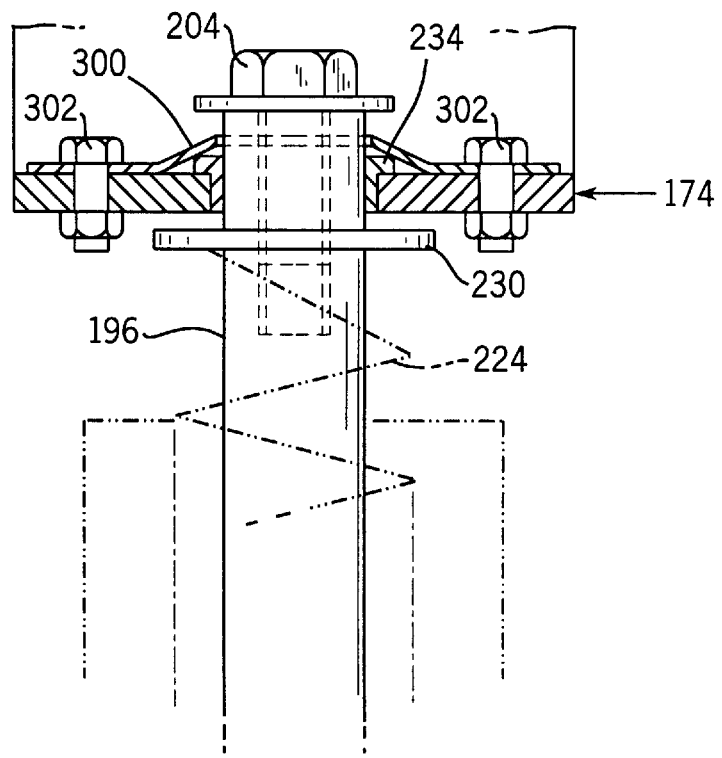
FIG. 15 is a cross-sectional view illustrating an alternate bearing and bearing retainer arrangement for the upper mounting bracket.

FIG. 15 illustrates an alternate arrangement for retaining the bearing 234 in the upper mounting bracket 174, including a bearing retainer 300 which is bolted to the bracket 174 with bolts 302.

FIGS. 16–19 illustrate alternate upper 304 and lower 306 mounting brackets, which are identical to the previously described brackets in basic function, but differ in the constructional details. The lower bracket 306 is U-shaped, having side flanges 308 extending from a common web 310, and a bottom flange 312 extending from the web 310 is welded to the side flanges 308. The post 196 is welded to and extends upwardly from the bottom flange 312. Stop bolt 204 is threaded into the top of post 196 as in the other embodiments. Two bolts 245 secure the bracket 306 to the rail end 130.

Spring 224 bears directly against the flange 312 and against flange 320 of upper bracket 304. Bracket 304 is also U-shaped, with a reinforcing web 322 extending between and welded to the legs of the "U", i.e., to the lower flange 320 and to the upper flange 324. Web 328 spans the flanges 320 and 324. Upper flange 324 has a hole 330 in it for nesting the head of bolt 204 in when the bolt 204 stops against mounting plate 326, which is welded to the upper flange 324.

It can thus be appreciated that the invention contemplates a pair of mounting assemblies for accommodating vertical movement of a slide-out room section relative to an extension member, such as an inner rail member, when a slide-out room section is moved between extended and retracted positions to provide a flat floor condition when fully extended and to provide a relatively simple and efficient construction enabling the slide-out room section to be raised relative to the stationary room section to allow retraction of the slide-out room section. Utilization of the biasing and cushioning arrangement enables a more efficient moving of the movable room section to the retracted position, as well as a more gentle, quieter transfer of the movable room section to its extended position.

Various alternative and embodiments are contemplated as being within the scope of the following claims particularly pointing out and distinctly claiming the subject matter regarded as the invention.

What is claimed is:

1. A flat floor arrangement for a vehicle having a movable room section, the movable room section having a floor and being movable relative to a stationary room section having a floor, comprising:

an operating mechanism having an extension member mounted to the vehicle and interconnected with the movable room section for laterally moving the movable room section relative to the stationary room section between a retracted position and an extended position for increasing the interior volume of the vehicle;

a vertically movable connection arrangement interposed between the movable room section and the operating mechanism for providing substantially vertical movement of the movable room section relative to the operating mechanism as the movable room section is moved laterally relative to the stationary room section, wherein the vertically movable connection arrangement includes a support member interconnected with the extension member and movable therewith, and a mounting member secured to the movable room section and engaged with the support member, wherein the mounting member is mounted to the support member so as to be vertically movable relative thereto such that vertical movement of the mounting member relative to the support member results in vertical movement of the movable room section relative to the extension member; and wherein the support member defines a first laterally extending wall and the mounting member defines a second laterally extending wall within which an opening is formed, and wherein the support member extends through the opening so as to provide vertical movement of the mounting member relative to the support member, and further comprising a stop structure associated with the support member and engageable with the mounting member for limiting the range of vertical movement of the mounting member relative to the support member.

2. The flat floor arrangement of claim 1, wherein the stop structure comprises an adjustable stop member engaged with the support member and engageable with the mounting member when the movable room section is in its extended position.

3. The flat floor arrangement of claim 1, wherein the support member includes a vertically extending web disposed against an outer end of the extension member and joined to the first laterally extending wall.

4. The flat floor arrangement of claim 3, wherein the support member further includes a pair of parallel connecting ears extending rearwardly of the web and connected to sides of the extension member.

5. The flat floor arrangement of claim 1, wherein the support member and the extension member have adjustment structure for permitting adjustability of the support member relative to the extension member and the mounting member.

6. The flat floor arrangement of claim 1, wherein the support member further includes a post fixed to and extending upwardly from the first laterally extending wall, the post being internally threaded to receive a threaded shaft of a stop bolt engageable with the mounting member when the movable room section is in its extended position.

7. The flat floor arrangement of claim 6, wherein a nut and a first washer are engaged on the threaded shaft of the stop bolt and disposed against a top end of the post.

8. The flat floor arrangement of claim 7, including a second washer loosely supported on the post beneath the second laterally extending wall.

9. The flat floor arrangement of claim 8, including a bearing surrounding the post and having an upper portion disposed in the opening formed in the second laterally extending wall of the mounting member, and a lower portion engageable with the second washer, the bearing permitting vertical sliding movement of the mounting member relative to the support member as the movable room section is moved between its extended and retracted positions.

10. The flat floor arrangement of claim 1, wherein the mounting member includes a vertical member extending upwardly from the second laterally extending wall, and a third laterally extending wall joined to the vertical member and secured to an underside of the movable room section floor.

11. The flat floor arrangement of claim 8, further comprising a biasing and cushioning arrangement interposed between the mounting member and the support member urging the movable room section upwardly as the movable room section is moved to its retracted position, and preventing shock to the vehicle as the movable room section is lowered to its extended position.

12. The flat floor arrangement of claim 11, wherein the biasing and cushioning arrangement comprises a coil spring surrounding the post and engaged between the first laterally extending wall of the support member and an underside of the second washer.

13. The flat floor arrangement of claim 1, wherein the mounting member and the support member are constructed and arranged so as to provide an angular offset therebetween during movement of the movable room section between its extended and retracted positions so as to enable the movable room section floor to tip relative to the stationary room section floor as the weight of the movable room section outwardly of the stationary room section floor exceeds the weight of the movable room section supported by the stationary room section floor to provide downward movement of the outer end of the movable room section.

14. The flat floor arrangement of claim 1, including a cooperative support arrangement interposed between the movable room section floor and the stationary room section floor for providing substantially vertical movement of the inner end of the movable room section as the movable room section is moved laterally relative to the stationary room section.

15. In a vehicle including a stationary room section having a floor, a movable room section having a floor and being laterally movable between a retracted position and an extended position for increasing the interior volume of the vehicle, the movable room section having an inner end and an outer end, and an operating mechanism interconnected with the movable room section for laterally moving the movable room section between its extended and retracted positions, wherein the operating mechanism includes an extension member mounted for lateral movement relative to the vehicle, the improvement comprising:

a vertically movable connection arrangement interconnected with the movable room section at a location spaced from the inner end of the movable room section for providing substantially vertical movement of the outer end of the movable room section as the movable room section moves laterally relative to the stationary room section;

wherein the vertically movable connection arrangement includes a support member interconnected with the extension member and movable therewith, and a mounting member secured to the movable room section and engaged with the support member;

wherein the support member defines a first laterally extending wall, and an upwardly extending post fixed thereto, and the mounting member defines a second laterally extending wall slidably mounted relative to the post; and a biasing and cushioning arrangement surrounding the post and having one end acting against the first laterally extending wall and another end acting against a movable element slidably mounted on the post for urging the movable room section upwardly as the movable room section is moved to its retracted position, and for preventing shock to the vehicle as the movable room section is lowered to its extended position.

16. A flat floor arrangement for a vehicle having a movable room section having a floor and being movable relative to a stationary room section having a floor, comprising:

an operating mechanism having an extension member mounted to the vehicle and interconnected with the movable room section for laterally moving the movable room section relative to the stationary room section between a retracted position and an extended position for increasing the interior volume of the vehicle; and a vertically movable connection arrangement interposed between the movable room section and the operating mechanism for providing substantially vertical movement of the movable room section relative to the operating mechanism as the movable room section is moved laterally relative to the stationary room section, wherein the connection arrangement includes an axially extending post associated with one of the movable room section and the operating mechanism, and a bearing member associated with the other of the movable room section and the operating mechanism, wherein the bearing member is slidably mounted to the post and is configured and arranged so as to accommodate angular movement between the bearing member and the post as the movable room section is moved vertically relative to the stationary room section during movement of the movable room section between its retracted position and its extended position.

17. The flat floor arrangement of claim 16, wherein the post is mounted to a support member affixed to the extension member, and wherein the bearing is mounted to a mounting member secured to the movable room section within an opening formed in the mounting member.

18. The flat floor arrangement of claim 17, further comprising a biasing element interposed between the support member and the mounting member for urging the movable room section upwardly.

19. In a vehicle including a stationary room section having a floor, a movable room section having a floor and being laterally movable between a retracted position and an extended position for increasing the interior volume of the vehicle, the movable room section having an inner end and an outer end, and an operating mechanism interconnected with the movable room section for laterally moving the movable room section between its extended and retracted positions, wherein the operating mechanism includes an extension member mounted for lateral movement relative to the vehicle, the improvement comprising:

a vertically movable connection arrangement interconnected with the movable room section at a location spaced from the inner end of the movable room section for providing substantially vertical movement of the outer end of the movable room section as the movable room section moves laterally relative to the stationary room section;

a vertically adjustable stop member associated with the connection arrangement for supporting the movable room section when the movable room section is in its extended position; and a vertical adjustment arrangement interposed between the extension member and the vertically movable connection arrangement for providing adjustment in the vertical arrangement of at least a portion of the vertically movable connection arrangement relative to the extension member and the movable room section.

20. The improvement of claim 19, wherein the vertically adjustable stop member is provided on a post member interconnected with the extension member, wherein the post member is mounted to a support member, and wherein the vertical adjustment arrangement interposed between the extension member and the vertically movable connection arrangement is interposed between the support member and the extension member.

21. In a vehicle including a stationary room section having a floor, a movable room section having a floor and being laterally movable between a retracted position and an extended position for increasing the interior volume of the vehicle, the movable room section having an inner end and an outer end, and an operating mechanism interconnected with the movable room section for laterally moving the movable room section between its extended and retracted positions, wherein the operating mechanism includes an extension member mounted for lateral movement relative to the vehicle, the improvement comprising:

a vertically movable connection arrangement interconnected with the movable room section at a location spaced from the inner end of the movable room section for providing substantially vertical movement of the outer end of the movable room section as the movable room section moves laterally relative to the stationary room section; and a stop member for supporting the movable room section in a lowered position.

22. The improvement of claim 21, wherein the vertically movable connection arrangement comprises a support member mounted to the extension member and a mounting member secured to the floor of the movable room section, wherein the mounting member and the support member are mounted for vertical movement relative to each other for providing vertical movement of the movable room section, and wherein the stop member is associated with the vertically movable connection arrangement.

23. The improvement of claim 22, wherein the vertically movable connection arrangement further includes a post member mounted to the support member and wherein the mounting member includes an opening through which the post member extends, and wherein the stop arrangement comprises an adjustable height stop member extending from an upper end defined by the post member.

24. The improvement of claim 23, wherein the mounting member includes a lower wall within which the opening is formed for receiving the post member, and an upper wall spaced above the lower wall and mounted to the floor of the movable room section, and wherein the stop member is engageable with the floor of the movable room section through the upper wall of the mounting member.

25. In a vehicle including a stationary room section having a floor, a movable room section having a floor and being laterally movable between a retracted position and an extended position for increasing the interior volume of the vehicle, the movable room section having an inner end and an outer end, and an operating mechanism interconnected with the movable room section for laterally moving the movable room section between its extended and retracted positions, wherein the operating mechanism includes an extension member mounted for lateral movement relative to the vehicle, the improvement comprising:

a vertically movable connection arrangement interconnected with the movable room section at a location spaced from the inner end of the movable room section for providing substantially vertical movement of the outer end of the movable room section as the movable room section moves laterally relative to the stationary room section; and one or more wedges fixed to said movable room section beneath said movable room section, said one or more wedges each having an angled surface for camming on said vehicle to help lift and support said movable room section when said movable room section is retracted into said stationary room section;

wherein said vertically movable connection arrangement includes a post axially slidably received in a bearing for relative vertical sliding motion between said post and said bearing.

26. The improvement of claim 25, wherein said vertically movable connection arrangement permits relative angular motion between said movable room section and said stationary room section.

27. The improvement of claim 25, wherein said bearing is fixed to said movable room section and said post is fixed to said stationary room section.

28. The improvement of claim 25, wherein said vertically movable connection arrangement includes a spring biasing said movable room section upwardly relative to said stationary room section.

29. The improvement of claim 25, wherein said vertically movable connection arrangement includes an adjustable stop for supporting said movable room section when said movable room section is extended.

* * * * *